United States Patent [19]
Harrom

[11] 3,880,469
[45] Apr. 29, 1975

[54] STABILIZER FOR DUMP BOX
[75] Inventor: Harley A. Harrom, Benson, Minn.
[73] Assignee: TCI, Inc., Benson, Minn.
[22] Filed: May 22, 1973
[21] Appl. No.: 362,749

[52] U.S. Cl. ............................................ 298/17 SG
[51] Int. Cl. ............................................. B60p 1/04
[58] Field of Search .................... 298/17 SG, 10, 18

[56] References Cited
UNITED STATES PATENTS

| | | | |
|---|---|---|---|
| 2,350,141 | 5/1944 | Wood | 298/17 SG |
| 2,570,334 | 10/1951 | Erjavec | 298/17 SG |
| 3,048,284 | 8/1962 | Cissna | 298/17 SG |

*Primary Examiner*—Robert B. Reeves
*Assistant Examiner*—Thomas E. Kocovsky
*Attorney, Agent, or Firm*—Dugger, Johnson & Westman

[57] ABSTRACT

A stabilizer for a high dump box which is operable to provide a stable support for the box and vehicle carrying the box when the box is dumped, and is easily stowed in a storage position when not in use.

7 Claims, 7 Drawing Figures

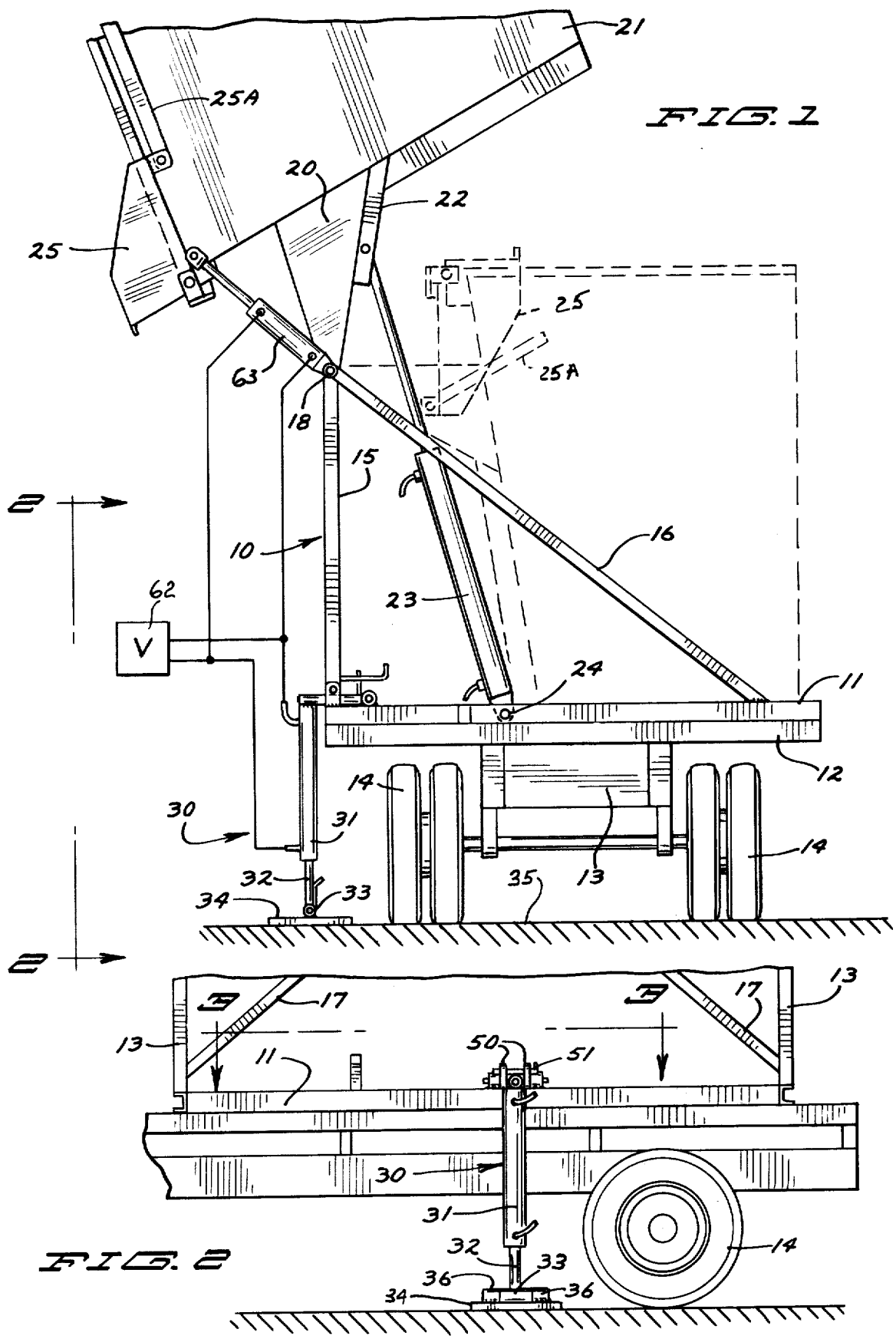

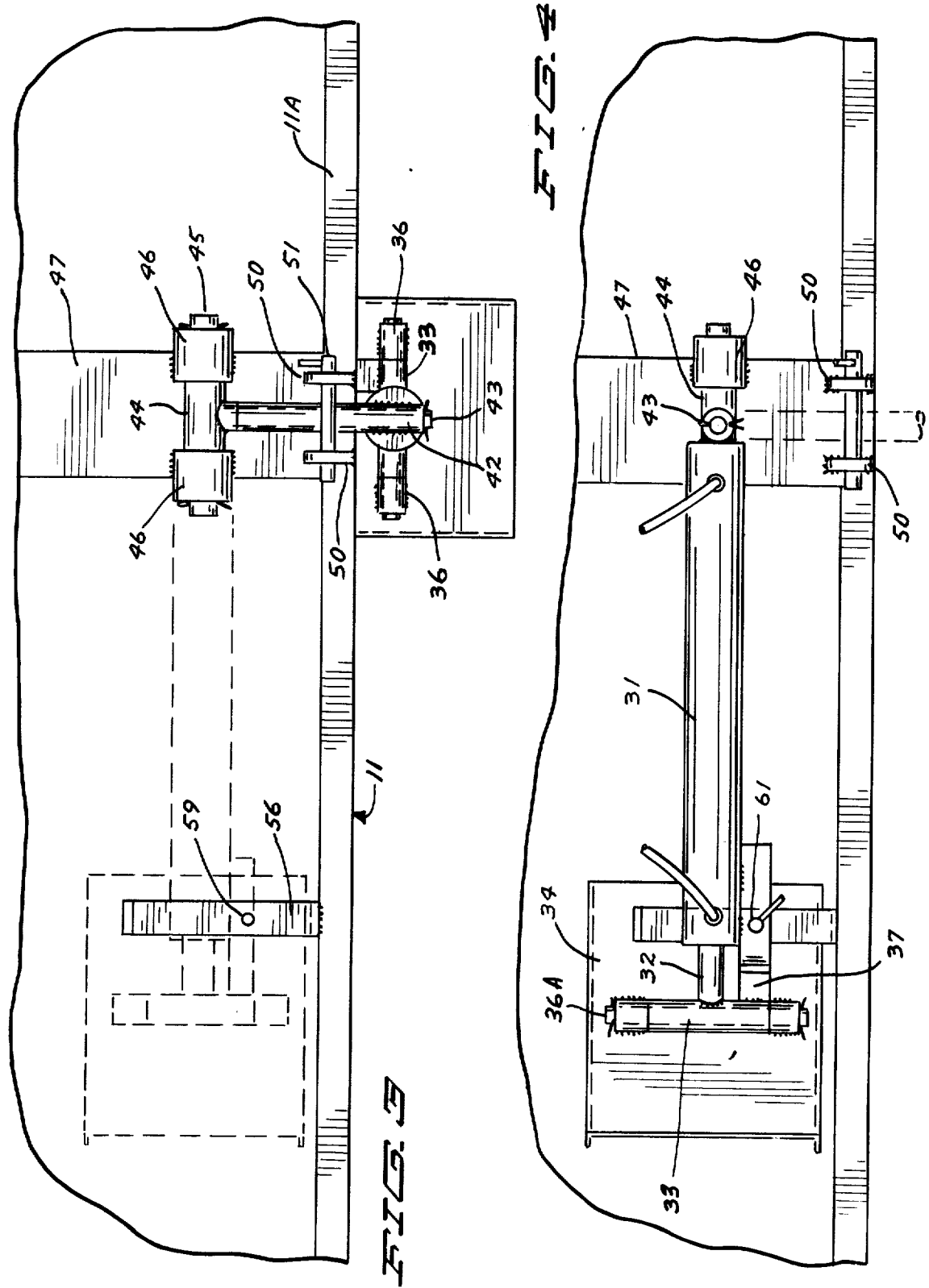

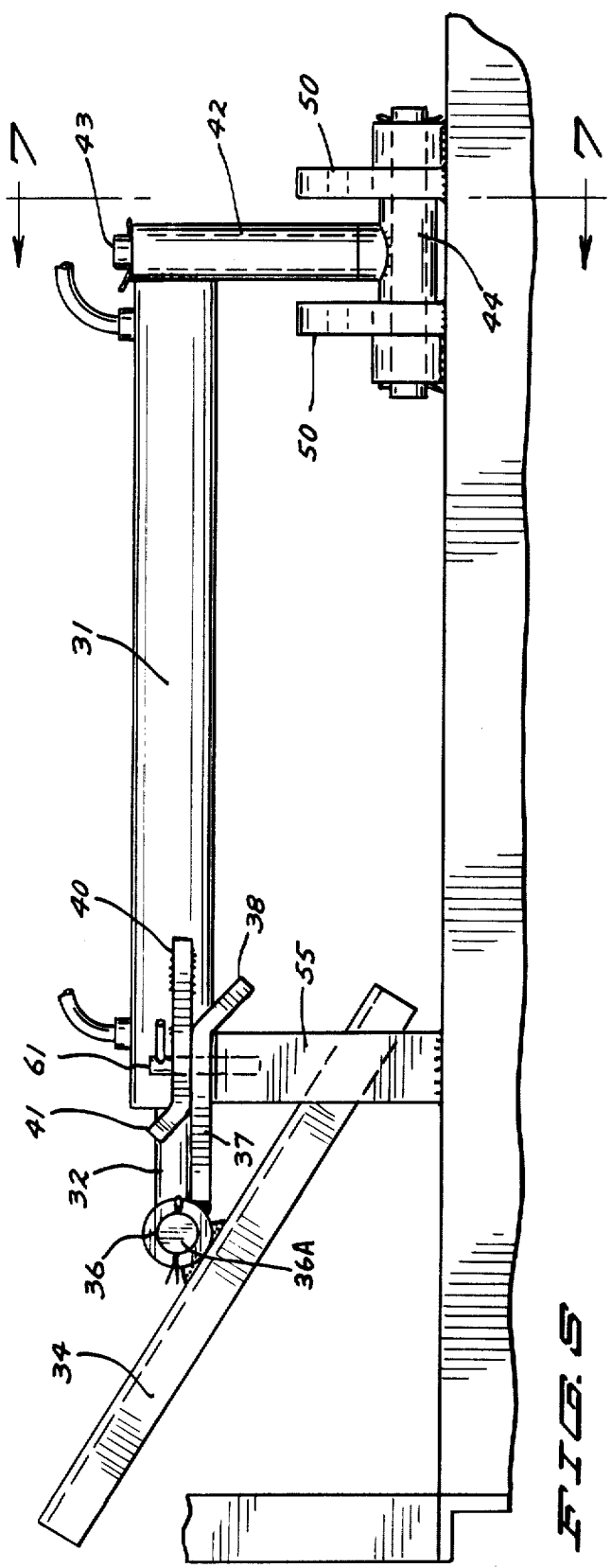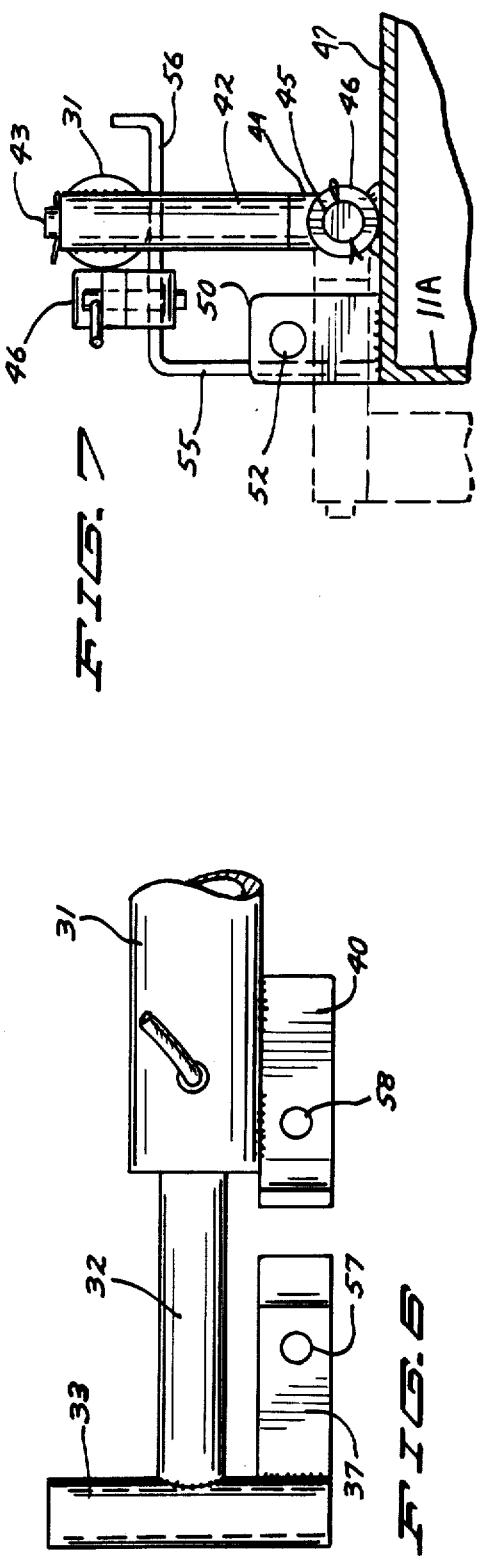

STABILIZER FOR DUMP BOX

BACKGROUND OF THE INVENTION

1. Field of the Invention

The present invention has relation to stabilizers for a high dump box mounted on a mobile vehicle or chassis.

2. Prior Art

In the prior art there have been a wide number of different types of high dumping boxes that have been used for transferring material from a large storage box into some other container. These large boxes are made so that they will dump into another box on another vehicle, and therefore the dumping height is quite high. When the center of gravity gets high any eccentric loads on the box or any other sudden loads can cause severe loads on the supporting frame and chassis. In some instances frames of trucks carrying the boxes have been twisted. U.S. Pat. No. 3,633,971, issued Jan. 11, 1972 to Berkey et al. shows a box of the general type on which the stabilizer of the present invention is useful.

SUMMARY OF THE INVENTION

The present invention relates to a direct acting stabilizer cylinder for use with mobile vehicles particularly for dumping boxes. The stabilizer is a cylinder that is mounted in a unique manner so that it can be pivoted to a stored position alongside the frame of the box, and easily pivoted downward to a working position where it acts directly against the ground surface on a foot plate to provide a stable support for the vehicle mounting the dumping box.

The direct acting cylinder used as a stabilizer is mounted so that it is locked positively in place onto a subframe supporting the dumping box, and it will directly carry the load that is exerted. It is positioned outside of the frame to provide an outrigger support. In use, the stabilizer cylinder and its supporting members fold to position within the space defined by the outer periphery of the frame supporting the box so that the stabilizer cylinder does not take up any additional space during transport.

The direct acting cylinder is made so that it can be locked into position in a stored position and the same valve that is utilized for the stabilizer cylinder can be used for other purposes on the dump box. This is particularly important where the costs of valves is a factor in commercialization of units so that a valve can have dual purpose and can be used on other items even when the stabilizer is in its stored position.

BRIEF DESCRIPTION OF THE DRAWINGS

FIG. 1 is an end elevational view of a typical dumping box having a stabilizer thereon made according to the present invention;

FIG. 2 is a fragmentary side elevational view of the device of FIG. 1 shown as viewed along line 2—2;

FIG. 3 is a sectional view taken as on line 3—3 in FIG. 2;

FIG. 4 is a top plan view of the cylinder in its stored position, which is shown in dotted lines in FIG. 3;

FIG. 5 is a side elevational view of the device of FIG. 4 in its stored position;

FIG. 6 is a fragmentary enlarged view of the rod end of the device of FIG. 5; and FIG. 7 is a sectional view taken as on line 7—7 in FIG. 5.

DESCRIPTION OF THE PREFERRED EMBODIMENT

Referring to the drawings, and in particular FIG. 1, a dumping box illustrated generally at 10 includes a subframe 11 which is rectangular as shown to provide a base, and the subframe 11 is mounted onto a frame member 12 that in turn is mounted onto a truck 13 or other vehicle that has suitable support wheels 14. The unit is shown in position on the truck bed. Normally the truck frame will be mounted to the axles on which wheels 14 are carried through springs. Upright members 15 are provided along one side of the frame 11, and suitable braces 16 and 17 (see FIG. 2 also) are used for strengthening the upright members 13. The framework including the upright members 15 forms pivot members 18 at the upper ends thereof. The pivot members 18 pivotally mount a frame 20 which is attached to the side of a dumping box 21. The frame 20 extends laterally outwardly from the side of the dumping box to increase the vertical height of the dumping edge of the box when it is in its dumping position. The frame 20 is suitably reinforced, and includes members 22 to which the rod end of a hydraulic cylinder-piston assembly 23 is mounted. The lower end of the piston cylinder assembly 23 is mounted as at 24 to the frame 11. As can be seen, the cylinder 23 can be actuated to tilt the dumping box to the dumping position shown in FIG. 1 about the pivot axis formed by pivot members 18. This means that the dumping height of the box is raised substantially above the ground, and of course when the weight of the material starts flowing out of the box over the end of the outwardly extending chute 25, the center of gravity of the box will be shifted a substantial amount in direction toward pivot members 18 so that it will move into a position over one of the sets of wheels 14. The load along one side of the frame, over one set of springs can cause twisting of the truck frame.

In order to stabilize the unit when it is dumped and provide an outrigger type of support, the stabilizer illustrated generally at 30 is provided. The stabilizer as shown comprises a double acting hydraulic cylinder 31 which has an internal piston and a piston rod 32, with a rod end connector 33 at the outer end thereof. The rod end 33 in turn is pivotally mounted to a foot plate 34 that will engage the ground surface 35 when the unit is in its working position shown in FIG. 1.

The details of the stabilizer assembly 30 are perhaps best shown in FIGS. 3–7. The rod end 33 of the cylinder, as shown, is a sleeve attached to the rod 32. The sleeve 33 mates with short tubular portions 36 on the foot plate 34, and a pin 36A through the tubular portions 36 and sleeve 33 pivotally mounts the foot plate onto the rod. The sleeve 33 also has a guide bar 37 welded thereto, and the guide bar 37 has a outwardly inclined end portion 38, that is made to mate with a second guide bar 40 welded to the cylinder 31. The guide bar 40 also has an outwardly inclined end portion 41 so that when the piston rod 32 is retracted these guide portions 38 and 41 will engage and tend to slide past each other to properly position the foot plate 34 for storage.

The base end of the cylinder 31 has a mounting tube 42 thereon which has a portion extending laterally to one side of the cylinder 31, as can perhaps best be seen in FIGS. 3, 5, and 7. The tube 42 is mounted over a pin 43. The pin 43 has a head 44 formed with a cross tubular section that in turn is mounted over a pin 45 that passes through a pair of tubular sections 46,46 that are spaced apart to receive the tubular section of the pin head 44. The tubular sections 46,46 are fixedly mounted onto a cross member 47 that is fixed to the frame 11. The cylinder 31 is thus pivotable about the axis of the pin 43 on tube 42 and also swings about the axis of pin 45 which passes through the tubular section of head 44 of pin 43. The cylinder 31, however is mechanically held in working position and in storage position.

The outer edge member 11A of the frame 11 has a pair of spaced upright ears 50,50 attached thereto. The ears 50,50 are spaced apart a sufficient distance to permit outwardly extending portion of the tube 42 mounted on the base of the cylinder 31 to fit therebetween. A lock pin 51 passes through provided openings 52 in the ears 50, and the pin 51 will lock the tube 42 in position underneath the pin 51 and between the ears 50,50.

Thus when the cylinder 31 is in its working position as shown in FIGS. 1 and 2, the pin 51 traps the tube 42 and holds the cylinder 31 from moving upwardly about the axis of the pin 45. The cylinder 31 is thus locked in a position where it is on the outside of the frame 11. The tube 42 at the base of the cylinder pivots about the axis of pin 43 under gravity so that the rod is extending downwardly. The rod 32 is in its retracted position, the foot plate will clear the ground.

In this working position, the rod 32 can be extended by operating a suitable valve to direct fluid under pressure to the cylinder so that the foot plate 34 strikes the ground 35 and, depending upon the pressure in the cylinder the amount of force exerted by the cylinder can be controlled. The cylinder will engage the pin 51 and load will be carried by the cylinder 31 from the frame 11 through pin 51 and ears 50. The cylinder supports part of the load from the frame and transfers the load directly to the ground. The load on the springs on one side of a truck bed for example, which can cause frame twist are thus avoided.

The pivotal mounting of the foot plate 34 permits the foot plate 34 to move to distribute the load as evenly as possible on the ground surface 35, to provide a stable unit.

When the cylinder rod is retracted, so the rod 32 is all the way in, the pin 51 can be removed from the ears 50, and then the tube 42 and the cylinder can be rotated about the pin 45 to position where tube 42 extends uprightly from the frame member 47. The head of the pin 44 rotates on the pin 45 so that the unit comes to position as shown in FIG. 7.

Then, the cylinder 31 and tube 42 can be rotated about the axis of the pin 43 until the cylinder 31 extends in fore and aft directions with respect to the box. The foot plate 34 is then positioned over a support strap assembly 55 fixed to the frame 11 and which has a horizontally extending support leg 56 as shown in FIGS. 3, 4, and 5. When the rod 32 is fully retracted, the two guide members 37 and 40 are positioned so that they will move together as shown in FIG. 6 and mate with each other in position as shown in FIG. 5. The guide members 37 and 40 are provided with holes 57 and 58, respectively (see FIG. 6). The holes 57 and 58 are aligned with each other when the guide members 37 and 40 are positioned as shown in FIG. 5, and when the cylinder is rotated to position as shown in FIG. 5, these holes 57 and 58 also align with a hole 59 in the cross support member 56 (see FIG. 3). A pin 61 can be inserted through all of the aligning holes 57, 58 and 59 and locked into place so that the cylinder is held securely in the support 55 by means of the pin 61. The foot plate 34 is tilted so that it goes underneath the cross member 56, but is toward the inside of the upright part of the bracket 55 so that the foot plate is held out of the way. It can be seen that the pin 61 holds the rod 32 from extending, and the control valve illustrated at 62 can then be used to operate another cylinder 63 in parallel if desired without actuating the cylinder 31.

In particular, the cylinder 63 can be used for operating a hydraulically operated top and pouring spout assembly. When the stabilizer cylinder is being actuated during dumping, the spout assembly will be in its extended position and the top open. When the cylinder 31 is locked from extending the spout assembly and top can be actuated independently of the stabilizer cylinder, for example, when the top has to be opened for filling the box.

The cylinder 63 is used to operate the movable spout 25, and a linkage 25A connects it to the openable top member. The particular construction of this openable top and hydraulically actuated spout can be made as shown in the copending application of Robert Anderson, Ser. No. 362,748 filed on May 22, 1973 for Hydraulic Operated Dumping Spout And Cover For Side Dump Box, and assigned to the same assignee as this application.

The lock system for the stabilizer cylinder is used in a general case to indicate a manner in which the cylinder can be locked from extension so that another cylinder, that may be used independently of the stabilizer cylinder can be operated in parallel from the same valve 62 as the stabilizer cylinder.

The cylinder 63 may thus be used at times when the stabilizer is not to be used, for example, to open the top for filling box 21. As shown, whenever the stabilizer is needed, the cylinder 63 also will be actuated. The stabilizer is used when the box is to be dumped and the top will be open and the spout in pouring position. The second cylinder 63 is able to withstand the full pressure of the hydraulic system when fully extended. Thus the full regulated pressure of the system is available for operating the stabilizer cylinder.

In this manner the need for an additional valve is eliminated. The locking or latching means for storing the stabilizer cylinder forms an important feature. A separate valve is used for operating the tilting or dumping cylinders 23.

The cylinder 31 can be a standard hydraulic cylinder modified to include the mounting tubes necessary for pivoting of the cylinder base about two separate axis substantially perpendicular to each other, namely the axis of the pin 45 through the head 44, and the axis of the pin 43 through tube 42. This permits the unit to be moved to a storage position as shown, and locked positively in place for storage.

The parts of course are quite simply made, and low in cost. The unit is therefore quite economical to make, and foolproof in operation.

What is claimed is:

1. A stabilizer support for a tilting box mounted onto a frame for dumping movement about a tilting axis, including a fluid pressure actuated cylinder assembly, mounting means to pivotally mount a first end of said cylinder assembly to said frame including first means pivotally mounted to said frame about a first axis extending substantially parallel to said tilting axis and positioned inwardly from an adjacent side edge of said frame, which adjacent side edge extends in a direction generally along said first axis, said first means including an elongated support section, second means connected to said cylinder assembly and pivotally mounted to said elongated support section about a second axis at substantially right angles to said first axis, said second means being positioned on the elongated support section to offset said cylinder assembly laterally outward from said first axis so that said cylinder assembly is outwardly from said adjacent side edge of said frame when the second axis is substantially horizontal, means to releasably lock said elongated support section in a first position wherein said second axis extends generally horizontally and the cylinder assembly extends downwardly under gravity about said second axis and the first means is restrained from movement about said first axis, means on a second end of said cylinder assembly adapted to engage the ground when said cylinder assembly is in said first position and is actuated, means to actuate said cylinder assembly under fluid pressure, and means to release said releasable lock means to permit said cylinder assembly to be rotated about said first axis to position wherein said second axis and said elongated support section extend generally uprightly, and said cylinder assembly being rotatable about said second axis to a storage position generally parallel to the first axis and inwardly toward the center of the frame from said adjacent side edge.

2. A stabilizer support for a tilting box mounted onto a frame for dumping movement about a tilting axis, including a fluid pressure actuated cylinder assembly, mounting means to pivotally mount a first end of said cylinder assembly to said frame about a first axis extending substantially parallel to said tilting axis, and about a second axis at substantially right angles to said first axis, means to releasably lock said mounting means in a first position wherein said second axis extends generally horizontally and the cylinder assembly extends downwardly under gravity about said second axis and is restrained from movement about said first axis, foot plate means on a second end of said cylinder assembly adapted to engage the ground when said cylinder assembly is in said first position and is actuated, means to release said releasable lock means to permit said cylinder assembly to be rotated about said first axis to position wherein said second axis extends generally to position wherein said second axis extends generally uprightly, said cylinder assembly being rotatable about said second axis to a storage position generally parallel to said first axis, support means on said frame supporting the second end of said cylinder to hold said cylinder assembly in said storage position, said cylinder assembly including an outer cylinder member and a longitudinally extendable and retractable rod, and guide means cooperating between said cylinder member and said extendable and retractable rod to guide said rod to a predetermined rotational position with respect to said cylinder member as said rod is retracted.

3. The combination of claim 2 wherein said guide means comprise a pair of flat members which align with each other when the rod is retracted in said cylinder and properly rotationally positioned, said support including a portion aligning with said flat members, and means cooperating between said portion and said flat members to latch said flat members to said support to resist extension of said rod.

4. The combination as specified in claim 3, and a second fluid pressure actuated cylinder assembly on said box, a fluid pressure control valve means connecting said valve to control said fluid pressure actuated cylinder assemblies in parallel, said means to latch said rod of said first mentioned cylinder assembly permitting operation of said second cylinder assembly without operating said first mentioned cylinder assembly.

5. A stabilizer support for a tilting box mounted onto a frame for dumping movement about a tilting axis, including a fluid pressure actuated cylinder assembly, mounting means to pivotally mount a first end of said cylinder assembly to said frame about a first axis extending substantially parallel to said tilting axis and about a second axis at substantially right angles to said first axis, said mounting means comprising a tubular member fixedly attached to one end of said cylinder assembly, said tubular member having a central axis coinciding with said second axis, a pin, said pin having head means rotatably mounted to said frame about said first axis, said tubular member being rotatably mounted on said pin, means to releasably lock said pin with respect to said frame in a first position wherein said second axis extends substantially horizontally and the cylinder assembly extends downwardly under gravity about said second axis and is restrained from movement about said first axis by said releasable lock means, foot plate means on a second end of said cylinder assembly adapted to engage the ground when said cylinder assembly is in its said first position and is actuated, and means to actuate said cylinder assembly under fluid pressure.

6. The combination as specified in claim 5 wherein said cylinder assembly includes a cylinder member and an extendable and retractable rod, and wherein said tubular member is attached to said cylinder member, and means to pivotally mount said foot plate to the outer end of said rod.

7. The combination as specified in claim 5 wherein said releasable lock means comprises upstanding ears fixed along one edge of said frame, and spaced apart to receive said tubular member therebetween, and means to releasably retain said tubular member between said ears.

* * * * *